Patented Nov. 9, 1948

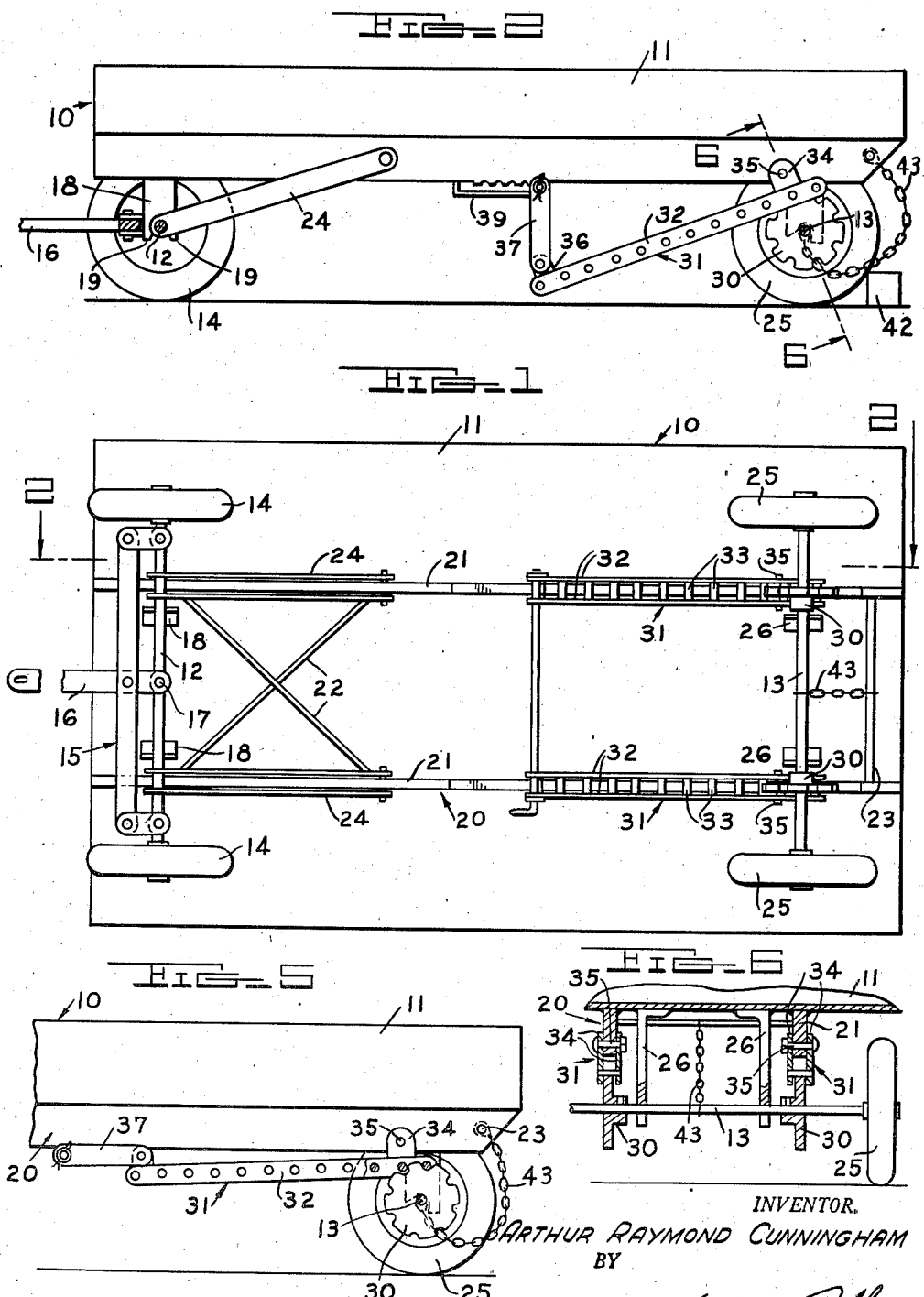

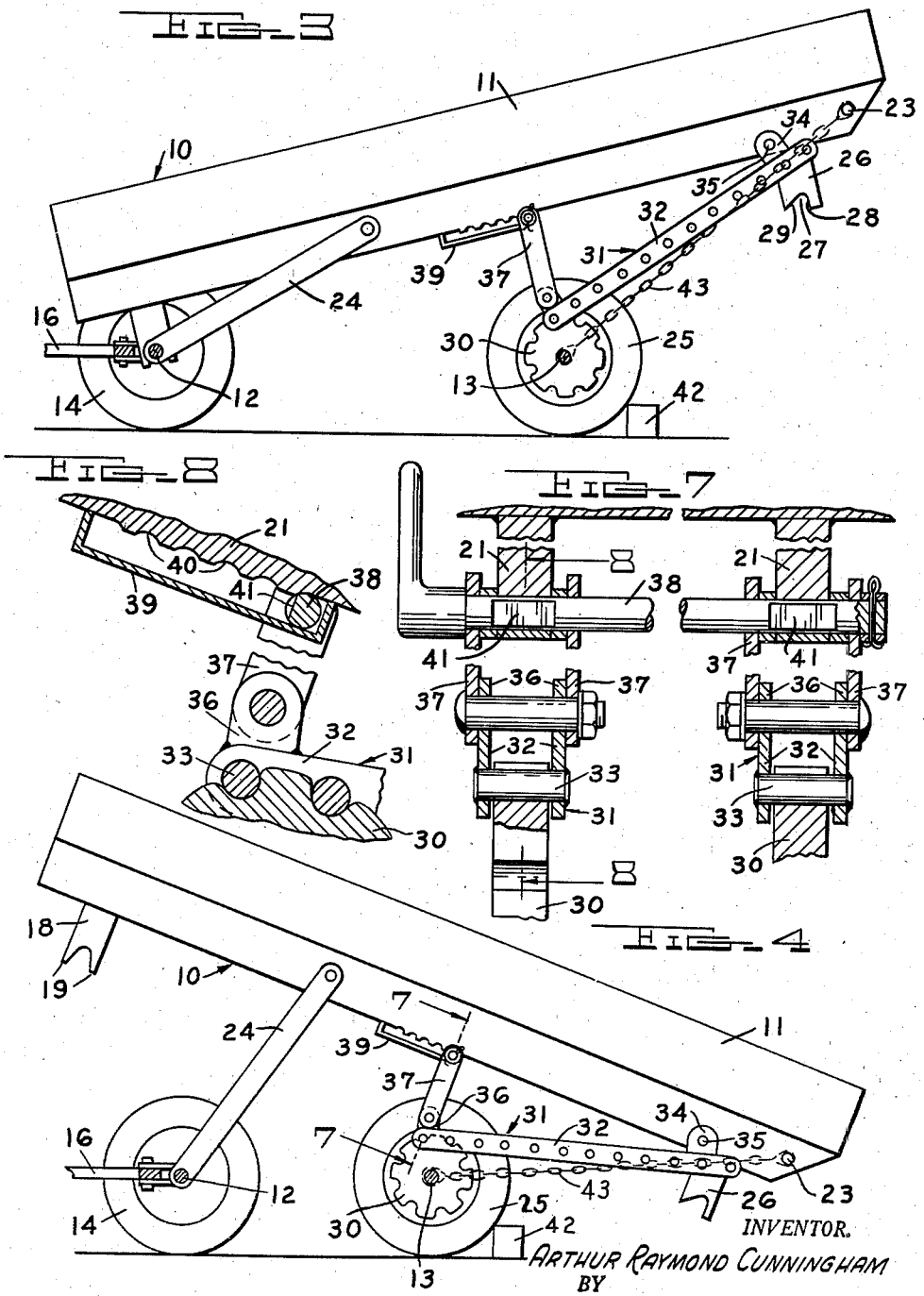

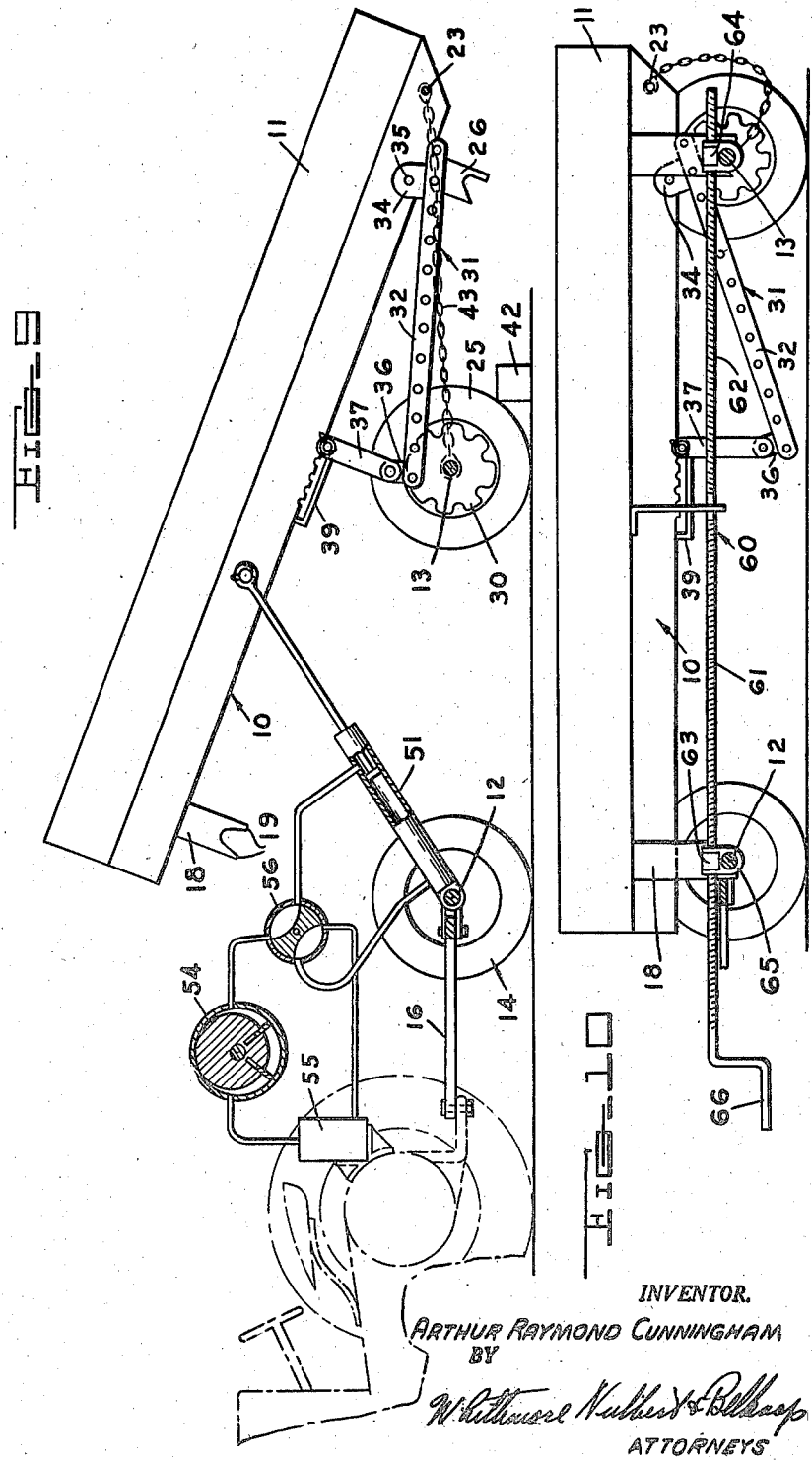

2,453,499

UNITED STATES PATENT OFFICE 2,453,499

VEHICLE CONSTRUCTION

Arthur Raymond Cunningham, Detroit, Mich.

Application December 23, 1946, Serial No. 718,003

15 Claims. (Cl. 298—20)

1

This invention relates generally to wagons, trailers or other types of vehicles and refers more particularly to improved means for unloading such vehicles.

One of the objects of this invention is to provide a vehicle having a load carrying body and having relatively simple means for tilting the body at such an angle that the contents of the body are dispensed by the action of gravity.

Another object of this invention is to provide a vehicle having a body connected to an axle for the ground engaging wheels by means releasable from the axle upon upward movement of the adjacent end of the body and having means responsive to shifting movement of the body relative to the axle to raise the end aforesaid of the body off the axle.

Still another object of this invention is to provide a toothed element supported for rotation about the axis of the axle and meshing with an elongated rack supported on the vehicle body beneath the latter to raise the body off the axle and to position the latter intermediate the ends of the body upon shifting movement of the body in a direction toward the axle.

A further feature of this invention is to provide a vehicle having a body supported on front and rear ground engaging wheel supporting axles and having means responsive to shifting movement of the body rearwardly relative to the rear axle to swing the front end of the body upwardly about the rear axle.

The foregoing as well as other objects will be made more apparent as this description proceeds, especially when considered in connection with the accompanying drawings, wherein:

Figure 1 is a bottom elevational view of a wagon or vehicle equipped with unloading means embodying the features of this invention;

Figure 2 is a sectional view taken substantially on the plane indicated by the line 2—2 of Figure 1;

Figure 3 is a sectional view similar to Figure 2 showing the parts in a different position;

Figure 4 is a view similar to Figure 2, except that the parts are shown in still another position;

Figure 5 is a fragmentary sectional view showing the parts in their normal position;

Figure 6 is a sectional view taken on the line 6—6 of Figure 2;

Figure 7 is a sectional view taken on the line 7—7 of Figure 4;

Figure 8 is a sectional view taken on the line 8—8 of Figure 7;

Figure 9 is a diagrammatic view of a modified form of vehicle body dumping mechanism; and Figure 10 is a sectional view showing still another embodiment of this invention.

The unloading feature forming the subject matter of the present invention is shown as applied to a typical farm wagon, although it will be understood as this description proceeds that the principle embodied in the present invention may be employed in connection with other types of vehicles. With this in view, reference is made more in detail to the drawings, wherein it will be noted that the numeral 10 indicates a farm type wagon having a load carrying body 11 removably supported on front and rear axles 12 and 13 respectively.

A pair of ground engaging wheels 14 are suitably pivotally supported at opposite ends of the front axle 12 for turning movement about substantially vertical axes and are connected together by linkage 15 to enable the wheels 14 to be turned as a unit about their respective steering axes. As shown particularly in Figure 1 of the drawings, the linkage 15 is operated by a pull bar 16 having the rear end pivotally connected to the axle 12 intermediate the ends of the latter by a pin 17 having its axis extending substantially vertically to enable swinging movement of the bar 16 in a generally horizontal plane. The bar 16 is also pivoted to the linkage 15 for actuating the latter to effect turning of the vehicle either to the right or left. This steering mechanism forms no part of the present invention, and may be of any suitable design.

The front end portion of the vehicle body 11 is releasably supported on the axle 12 by a pair of brackets 18 secured to the underside of the body 11 at points spaced from each other in the direction to the axle 12 and extending downwardly from the body. The lower ends of the brackets 18 are bifurcated, and are positioned so that the furcations 19 extend at opposite sides of the axle 12. Thus the furcations provide a driving connection between the axle 12 and the body, but do not interfere with raising the body off of the axle.

It will further be noted from Figure 1 of the drawings that the body 11 is reinforced by a frame 20 comprising laterally spaced side sills 21 extending in the direction of length of the body and connected together at the front end by an X-shaped cross brace 22. The rear ends of the sills are connected together by a cross member 23 having the opposite ends welded or otherwise permanently secured to the respective sills.

The front axle 12 is also connected to the respective sills 21 of the frame 20 by pairs of links 24. The front ends of the links are pivoted to the axle 12, and the rear ends of the links are pivoted to the frame 20 at points spaced rearwardly of the axle 12. The links 24 not only serve as an additional driving connection between the axle 12 and body 11, but also act to swing the front end of the body 11 upwardly in a manner to be more fully hereinafter described.

The rear axle 13 supports a pair of ground engaging wheels 25, and in the present instance, the wheels 25 are journalled on the axle 13, so that the latter is free to rotate relative to the wheels. The axle 13 also forms a support for the rear end of the body 11. As shown particularly in Figure 6 of the drawings, a pair of brackets 26 are welded or otherwise permanently secured to the body 11 in spaced relationship axially of the rear axle 13, and the lower ends of the brackets merely rest on the axle 13 to enable raising the body relative to the axle 13. In detail the lower end of each bracket 26 is formed with a recess 27 for receiving the axle 13, and the rear wall 28 of the recess extends at substantially right angles to the axis of the axle 13 to provide an abutment for engagement with the axle upon forward movement of the vehicle. The opposite wall 29 of the recess in each bracket 26 is tapered to provide the required clearance when the rear end of the body is swung upwardly to the position thereof shown in Figure 3 of the drawings.

It will further be noted from Figure 6 of the drawings that a pair of tooth members 30 are secured to the axle 13 in spaced relationship lengthwise of the axle, and have teeth thereon respectively engaging a pair of racks 31. Each rack 31 comprises a pair of links 32 secured together at longitudinally spaced points by pins 33 which cooperate with one another to form in effect a chain for engagement with the teeth on the adjacent member 30. The rear ends of the links 32 are formed with upwardly extending lugs 34, and the latter are pivoted to the rear end portion of the frame 20 by pins 35. The front end portions of the links are also provided with upwardly extending lugs 36, and the lugs 36 on the two pairs of links are respectively pivotally connected to the lower ends of pairs of links 37. The upper ends of the links 37 of each pair are respectively pivotally connected to the sill members 21 of the frame 20. Upon reference to Figure 7 of the drawings, it will be noted that a rock shaft 38 extends transversely of the frame 20 through the upper ends of the links 37, and is rotatably supported on the respective sill members 20 by retainers 39. The retainers 39 extend in the direction of length of the sill members and permit shifting movement of the rock shaft 38 in a corresponding direction. The purpose of this shifting movement is to vary the effective lengths of the links 37, and thereby change the angle of inclination of the racks 31. In order to hold the rock shaft 38 in various different positions lengthwise of the retainers 39, the portions of the sill members 21 forming the top walls of the retainers are fashioned to provide a plurality of arcuate recesses 40. Also the portions of the rock shaft registering with the retainer are provided with flats 41 to enable shifting movement of the rock shaft along the retainer by merely rotating the shaft to a position wherein the flats 41 are parallel to the retainer.

Operation

During normal operation of the vehicle, the racks 31 are in their elevated positions shown in Figure 5 of the drawings. In other words the rock shaft 38 assumes a position at the front ends of the retainers 39, and the links 37 locate the racks 31 in substantially parallel relationship to the body frame 20. Assuming now that it is desired to dump the load in the body 11, an obstruction 42 is placed to the rear of the wheels 25, and the rock shaft 38 is rotated to bring the flats 41 substantially parallel to the retainers 39. The rock shaft 38 is then shifted rearwardly relative to the retainers 39 to any selected position along the retainers. In the present instance the rock shaft 38 is shown in its rearwardmost position relative to the retainers 39. When in the selected position the rock shaft 38 is again rotated to position the flats 41 crosswise of the retainers to thereby lock the shaft 38 against further movement along the retainers.

Lifting the rock shaft 38 rearwardly relative to the retainers 39 drops the front end portions of the racks 31 to the positions thereof shown in Figure 2 of the drawings wherein the racks are inclined upwardly at an angle approximating the angle of inclination of the walls 29 on the brackets 26. Inasmuch as the rear ground engaging wheels are blocked from rearward movement by the abutments 42, it follows that rearward movement of the vehicle imparts a corresponding rearward movement of the racks 31 relative to the rear axle and effects a rotation of the toothed members 30 in a clockwise direction. As a result, the rear end of the body is raised off of the axle 13 to the position shown in Figure 3 of the drawings. In this connection, it will be noted that the extent of relative movement between the body and axle 13 is limited by a chain or other flexible linear member 43 having the opposite ends respectively connected to the axle 13 and the cross brace 23 on the body frame 20.

When the rear end of the body is tilted to the position thereof shown in Figure 3 of the drawings, the rear axle 13 is positioned susbtantially midway between opposite ends of the vehicle, so that the application of a continued force in a rearward direction on the vehicle causes the links 24 to swing the front end portion of the body upwardly about the axle 13 to the position shown in Figure 4 of the drawings. When in this position the body assumes a substantial angle of inclination relative to the ground and the load falls by gravity out of the back end of the body.

The body is restored to its normal position shown in Figure 5 of the drawings by merely asserting a pull on the bar 16 in a forward direction to move the front axle 12 in a corresponding direction. The links 24 then operate to lower the front end of the body, so that the brackets 18 again rest on the axle 12. The operator then manipulates the rock shaft 38 to enable sliding the latter forwardly in the retainers 39 to the positions indicated in Figure 5 of the drawings.

The embodiment of the invention shown in Figure 9 of the drawings illustrates hydraulic means 50 for tipping the body 11 of the vehicle about the rear axle 13. This may be accomplished by replacing the links 24 with one or more hydraulic motors having cylinders 51 and having pistons 52 reciprocably mounted in the cylinders. The hydraulic motors are installed with the axes of the cylinders extending lengthwise of the vehicle body 11 and the front ends of the cylinders are pivotally coupled to the front axle 12 in any suitable manner. The rear ends of the cylinders are apertured for the passage of the piston operating rods 53 and the rear ends of the latter are suitable pivoted to the body 11. In certain installations it may be desirable to provide only one hydraulic motor and, in such cases, the motor is preferably supported intermediate opposite sides of the body.

Regardless of the number of hydraulic motors employed, the opposite end of each cylinder is adapted to be alternatively connected to a pump 54 and a source of hydraulic fluid medium supply 55 through a suitable valve 56. The pump, valve and source of supply may be installed on the tractor and connected to the hydraulic motors on the vehicle 10 by detachable flexible connections of orthodox design.

With the above arrangement the rear end portion of the vehicle body 11 is elevated to the position shown in Figure 3 of the drawings in the same manner described in connection with the first embodiment. However, after the rear end portion of the body is tipped upwardly, the valve 56 is operated to connect the front end of the cylinder or cylinders to the delivery side of the pump 54, and to connect the rear end of the cylinder or cylinders to the source of supply 55. As a result the front end of the body 11 is raised off the axle 12 and the body is swung about the rear axle to the position indicated in Figure 4 of the drawings, wherein the load is discharged from the rear end of the body by the action of gravity.

The embodiment of the invention shown in Figure 10 of the drawing shows an arrangement wherein the body may be tipped to its unloading position without the assistance of either the tractor or the abutment 42. In detail the two axles are connected by a screw 60 having right and left hand threads 61 and 62 at opposite ends respectively threadably engaging a pair of nuts 63 and 64. The nut 63 is fixed to a bearing 65 mounted on the front axle 12, and the nut 64 is supported on the rear axle 13. The front end of the screw extends beyond the front of the body and is provided with a crank 66, or in some cases, may be coupled to suitable reversible drive mechanism, not shown.

With the above exceptions, the construction may be identical to the first described form of the invention shown in Figures 1 to 8 inclusive. As a result rotation of the screw 60 in one direction moves the axles in directions toward one another to the relative positions shown in Figure 4 of the drawings and the front end of the body is swung upwardly by the links 24 to its unloading position also shown in Figure 4 of the drawings. On the other hand, rotation of the screw in the opposite direction returns the axles to their normal positions shown in Figure 2 of the drawings and also restores the body to its normal position shown in the same figure.

What I claim as my invention is:

1. A vehicle comprising a body, first and second axles for supporting the body, ground engaging wheels carried by the axles, a detachable connection between the first axle and body, a connection between the second axle and body permitting said body together with the first axle to shift relative to the second axle in a direction toward the second axle to locate the latter intermediate the ends of the body, and means for swinging the body about the second axle in response to continued application of the force applied to shift the body relative to said second axle.

2. A vehicle comprising a body, first and second axles for supporting the body, ground engaging wheels carried by the axles, a detachable connection between the first axle and body, a connection between the second axle and body responsive to the application of a force applied to the body in the direction of the second axle to permit shifting movement of the body together with the first axle relative to the second axle in the above direction, means for limiting the extent of shifting movement of the body and first axle relative to the second axle and operable to locate the latter intermediate the ends of the body, and a link pivotally connecting the first axle to the body and responsive to the continued application of said force to swing the body about the second axle.

3. A vehicle comprising a body, first and second axles for supporting the body, ground engaging wheels carried by the axles, a detachable connection between the first axle and body, a connection between the second axle and body responsive to the application of a force applied to the body in the direction of the second axle to permit shifting movement of the body together with the first axle relative to the second axle in the above direction, means for limiting the extent of shifting movement of the body and first axle relative to the second axle and operable to locate the latter intermediate the ends of the body, and means responsive to the continued application of said force to lift the body off of the first axle and to swing said body about the second axle.

4. A vehicle comprising a body, a rotatable axle having ground engaging wheels rotatably supported thereon, means for supporting the body on the axle and releasable from the axle upon upward movement of the body relative to the axle, a rack extending lengthwise of the body and having one end pivotally connected to the body adjacent the axle, a link having the opposite ends respectively pivotally connected to the free end of the rack and body, means for swinging the link downwardly relative to the body to locate the rack in an inclined plane and operable to hold the rack in said plane, and a toothed element secured to the axle in meshing relationship with the rack and rotatable in response to shifting movement of the body relative to the axle in a direction toward the axle to lift the body from said axle and to tilt the body at an angle corresponding generally to the inclined plane of the rack.

5. A vehicle comprising a body, a rotatable axle having ground engaging wheels rotatably supported thereon, an elongated rack extending lengthwise of the body beneath the latter and having one end pivotally connected to the body at a point adjacent the axle, means connecting the opposite end of the rack to the body, a toothed element rotatable as a unit with the axle and arranged in mesh with the rack, and a connection between the body and axle releasable from the axle in response to shifting movement of the body and rack relative to the axle in a direction toward said axle.

6. A vehicle comprising a body, a rotatable axle having ground engaging wheels rotatably supported thereon, a pair of elongated racks extending lengthwise of the body beneath the latter adjacent opposite sides thereof, means respectively pivotally connecting opposite ends of the racks to the body and adapted to support the racks in a plane inclined downwardly from the axle, a pair of toothed elements rotatable as a unit with the axle and respectively meshing with the racks, and connections between the body and axle releasable from the axle in response to shifting movement of the body and racks relative to the axle in a direction toward said axle.

7. A vehicle comprising a body, a first axle, a second axle supported for rotation and spaced from the first axle lengthwise of the body, supporting means for the body on said axles releasable from the axles upon upward movement of the body relative to the axles, a toothed element rotatable as a unit with the second axle, means on the body cooperating with the toothed element upon shifting the body in the direction of its length toward the second axle to raise the body off the second axle, and a connection between the first axle and body operable in response to said shifting movement of the body to swing the latter upwardly around the second axle.

8. A vehicle comprising a body, a first axle, a second axle supported for rotation and spaced from the first axle lengthwise of the body, supporting means for the body on said axles releasable from the axles upon upward movement of the body relative to the axles, a toothed element rotatable as a unit with the second axle, an elongated rack on the body cooperating with the toothed element upon shifting the body relative to the second axle in a direction toward the latter to raise the body off the second axle and to move the adjacent end of the body substantially beyond the second axle, means for limiting the extent of movement of the body relative to the second axle and operable to locate the second axle intermediate the ends of the body, and a link connecting the first axle to the body and operable to swing the body upwardly about the second axle.

9. A vehicle comprising a body, a first axle, a second axle supported for rotation and spaced from the first axle lengthwise of the body, supporting means for the body on said axles releasable from the axles upon upward movement of the body relative to the axles, an elongated rack extending lengthwise of the body beneath the latter and having one end pivoted to the body adjacent the second axle, a link pivotally connected to the opposite end of the rack and having the free end pivotally connected to the body for sliding movement lengthwise of the rack, means for locking the free end of the link in different positions to vary the angle of inclination of the rack, a toothed element rotatable as a unit with the second axle and meshing with the rack, and a link having the opposite ends respectively pivotally connected to the first axle and body.

10. A vehicle comprising a body, first and second axles for supporting the body, ground engaging wheels carried by the axles, a detachable connection between the first axle and body, a connection between the second axle and body permitting said body together with the first axle to shift relative to the second axle in a direction toward the second axle to locate the latter intermediate the ends of the body, and means for swinging the body about the second axle.

11. A vehicle comprising a body, first and second axles for supporting the body, ground engaging wheels carried by the axles, a detachable connection between the first axle and body, a connection between the second axle and body permitting said body together with the first axle to shift relative to the second axle in a direction toward the second axle to locate the latter intermediate the ends of the body, and fluid operated means for swinging the body about the second axle.

12. A vehicle comprising a body, a first axle, a second axle supported for rotation and spaced from the first axle lengthwise of the body, supporting means for the body on said axles releasable from the axles upon upward movement of the body relative to the axles, a toothed element rotatable as a unit with the second axle, means on the body cooperating with the toothed element upon shifting the body in the direction of its length toward the second axle to raise the body off the second axle, and a fluid motor operable to swing the body about the second axle.

13. A vehicle comprising a body, a first axle, a second axle supported for rotation and spaced from the first axle lengthwise of the body, supporting means for the body on said axles releasable from the axles upon upward movement of the body relative to the axles, a toothed element rotatable as a unit with the second axle, an elongated rack on the body cooperating with the toothed element upon shifting the body relative to the second axle in a direction toward the latter to raise the body off the second axle and to move the adjacent end of the body substantially beyond the second axle, means for limiting the extent of movement of the body relative to the second axle and operable to locate the second axle intermediate the ends of the body, and fluid pressure operated means for swinging the body about the second axle.

14. A vehicle comprising a body, first and second axles for supporting the body, connections between the body and axles releasable from the latter upon upward movement of the body relative to the axles, means for relatively moving the axles in directions toward each other, and means responsive to relative movement of the axles toward one another to raise the body off the axles and to swing the body about one of said axles.

15. A vehicle comprising a body, first and second axles for supporting the body, connections between the body and axles releasable from the latter upon upward movement of the body relative to the axles, means for moving the axles toward one another including a screw having right and left hand threads adjacent opposite ends, nuts carried by the axles and respectively threadably engaging the right and left hand threaded portions of the screw, and means responsive to relative movement of the axles toward one another to raise the body off the axles and to swing the body about one of the axles.

ARTHUR RAYMOND CUNNINGHAM.

REFERENCES CITED

The following references are of record in the file of this patent:

UNITED STATES PATENTS

| Number | Name | Date |
|---|---|---|
| 1,400,752 | Land | Dec. 20, 1921 |

FOREIGN PATENTS

| Number | Country | Date |
|---|---|---|
| 340,375 | France | July 5, 1904 |